United States Patent
Annan

(10) Patent No.: US 9,551,120 B2
(45) Date of Patent: Jan. 24, 2017

(54) DEVICE AND METHOD FOR FRICTION DAMPING

(71) Applicant: VSL International AG, Koniz (CH)

(72) Inventor: Rachid Annan, Rapperswil (CH)

(73) Assignee: VSL INTERNATIONAL AG (CH)

( * ) Notice: Subject to any disclaimer, the term of this patent is extended or adjusted under 35 U.S.C. 154(b) by 0 days.

(21) Appl. No.: 15/106,200

(22) PCT Filed: Dec. 18, 2014

(86) PCT No.: PCT/EP2014/078564
§ 371 (c)(1),
(2) Date: Jun. 17, 2016

(87) PCT Pub. No.: WO2015/091859
PCT Pub. Date: Jun. 25, 2015

(65) Prior Publication Data
US 2016/0319498 A1 Nov. 3, 2016

(30) Foreign Application Priority Data
Dec. 18, 2013 (CH) .................................. 2096/13

(51) Int. Cl.
*E01D 19/00* (2006.01)
*E01D 19/16* (2006.01)
*F16F 7/08* (2006.01)

(52) U.S. Cl.
CPC ................ *E01D 19/16* (2013.01); *F16F 7/08* (2013.01)

(58) Field of Classification Search
CPC .................................. E01D 19/16; F16F 7/08
USPC ...................................................... 14/22, 78
See application file for complete search history.

(56) References Cited

U.S. PATENT DOCUMENTS

| 4,261,441 | A | * | 4/1981 | Wood | F03D 13/20 188/381 |
| 4,995,583 | A | | 2/1991 | De La Fuente | |
| 5,257,680 | A | * | 11/1993 | Corcoran | F16F 7/02 188/129 |
| 6,334,608 | B1 | | 1/2002 | Stubler | |

(Continued)

FOREIGN PATENT DOCUMENTS

| EP | 1035350 A1 | 9/2000 |
| FR | 2631407 A1 | 11/1989 |

(Continued)

OTHER PUBLICATIONS

International Search Report and Written Opinion for PCT/EP2014/078564, dated Apr. 1, 2015, 9 pages.

*Primary Examiner* — Raymond W Addie
(74) *Attorney, Agent, or Firm* — Blank Rome LLP

(57) ABSTRACT

A friction damping device (100) for damping relative movements between a first structural element and a second structural element of a construction, comprising: —a first damping system (110) for damping a first relative movement component and having a first friction surface (111) and a second friction surface (112), —a second damping system (120) for damping a second relative movement component and having a third friction element (121) and a fourth friction element (122). The first friction surface and the second friction surface of the first and the second damping system form a frictional engagement. The first damping system (110) and the second damping system (120) are placed in series.

18 Claims, 7 Drawing Sheets

(56) References Cited

U.S. PATENT DOCUMENTS

| | | | | |
|---|---|---|---|---|
| 6,443,437 B1* | 9/2002 | Beyene | ................. | B60G 11/22 |
| | | | | 267/141.1 |
| 7,631,384 B2* | 12/2009 | Lecinq | ................... | E01D 19/16 |
| | | | | 14/11 |
| 8,453,806 B2* | 6/2013 | Battlogg | ................... | F16F 9/46 |
| | | | | 188/266.3 |
| 2012/0247036 A1* | 10/2012 | Bournand | ............... | F16F 7/082 |
| | | | | 52/167.1 |

FOREIGN PATENT DOCUMENTS

| | | |
|---|---|---|
| FR | 2664920 A1 | 1/1992 |
| FR | 2751673 A1 | 1/1998 |
| JP | H0396506 A | 4/1991 |
| JP | 2001254312 A | 9/2001 |
| WO | WO-02/090681 A1 | 11/2002 |

* cited by examiner

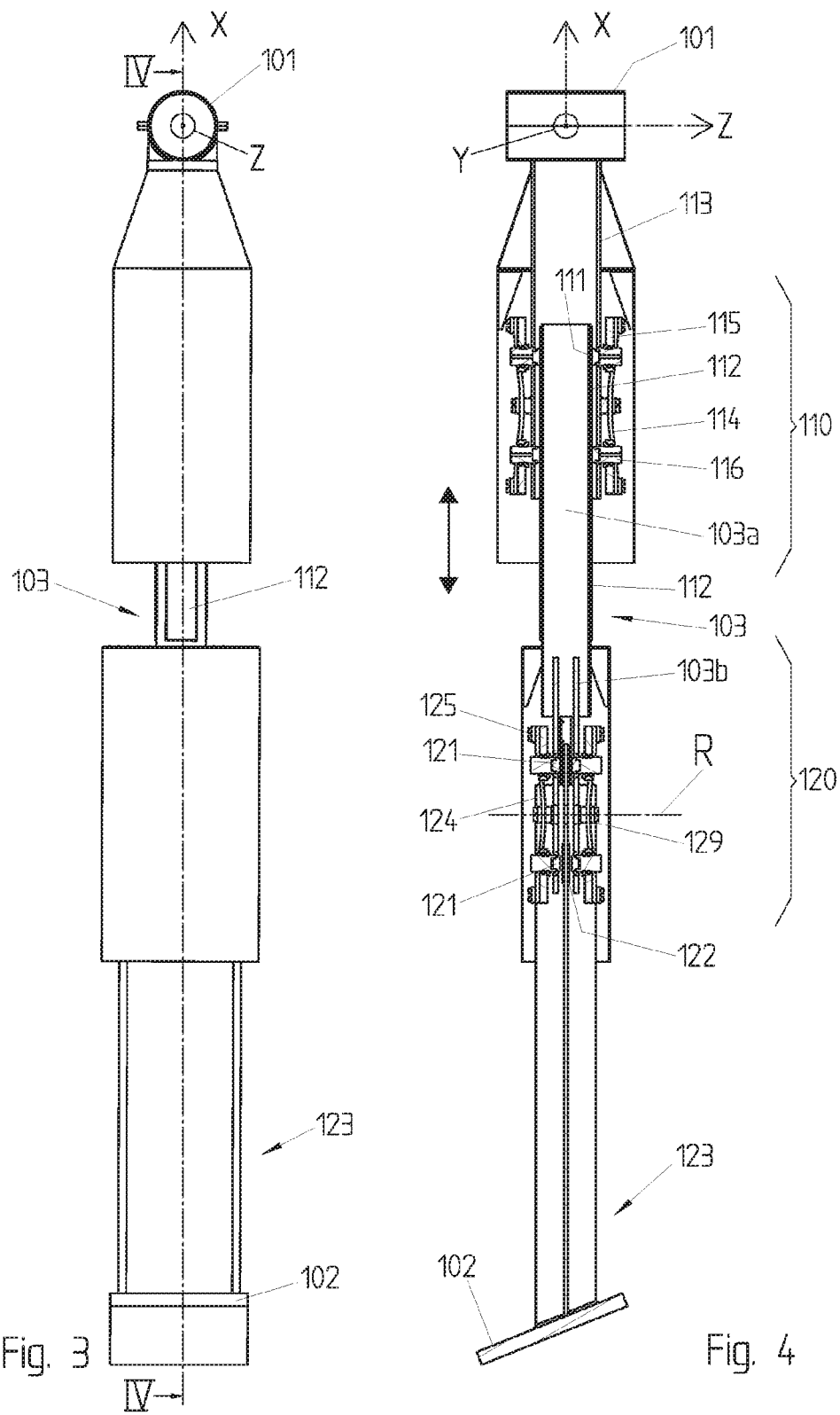

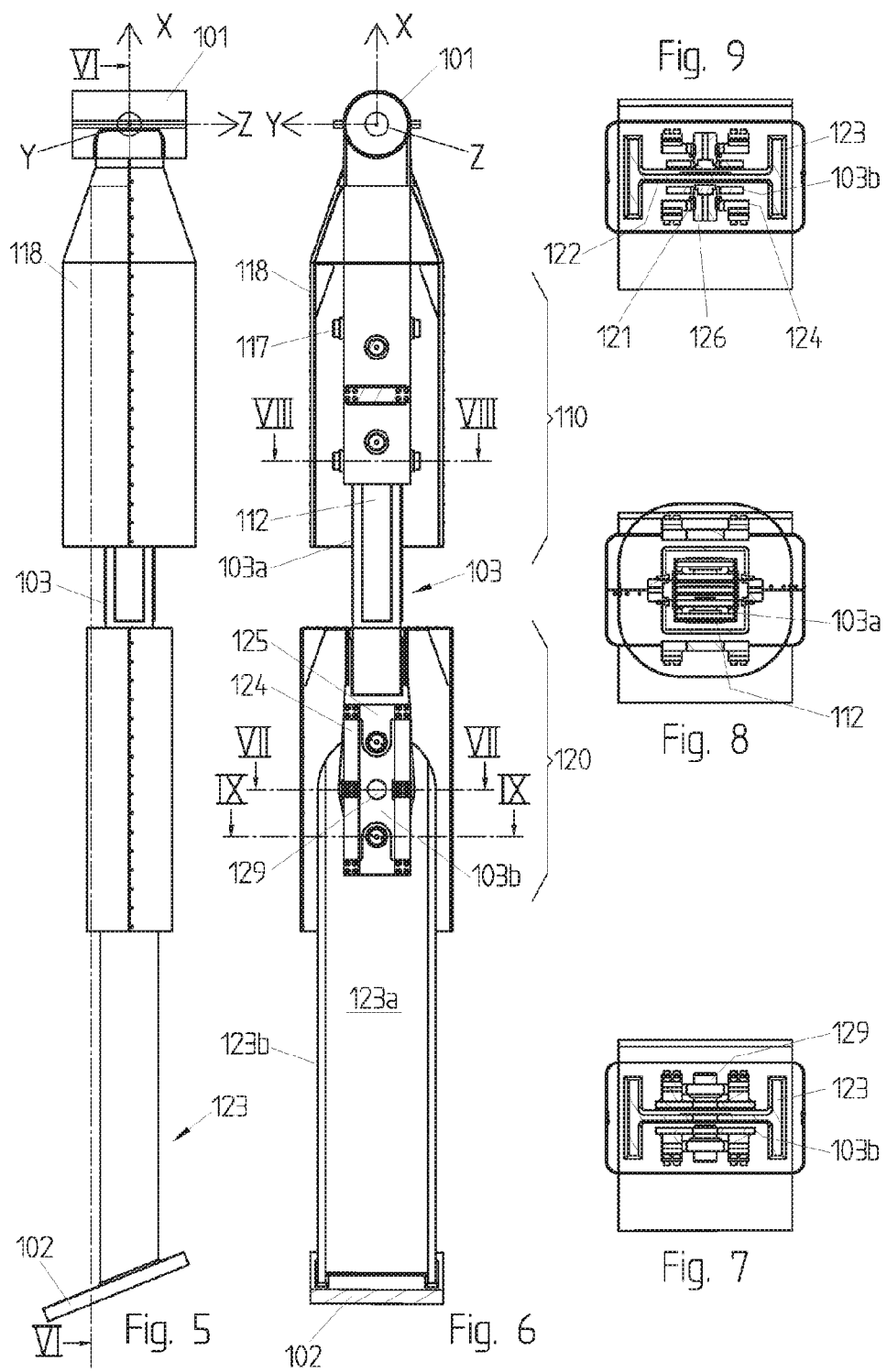

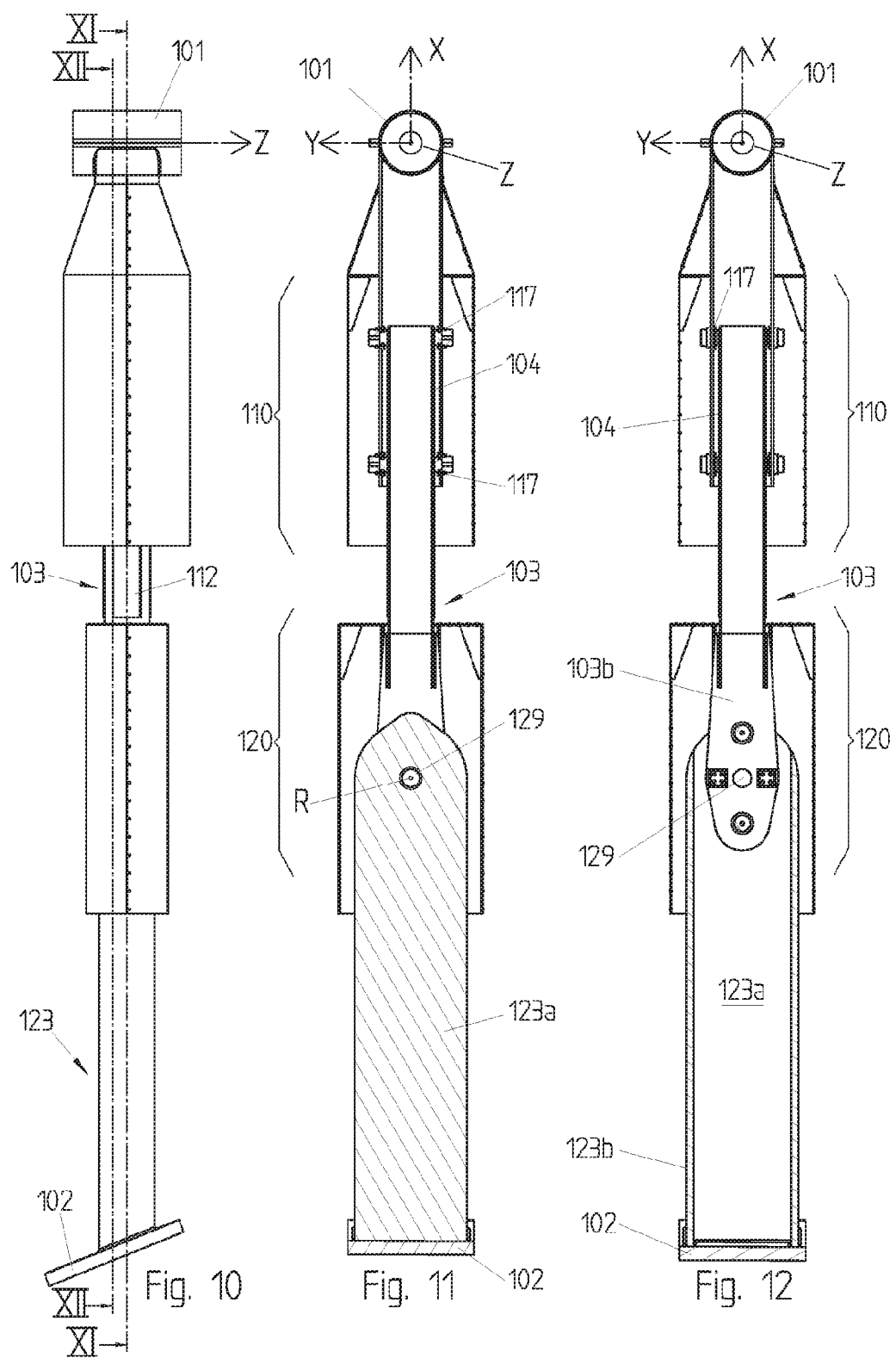

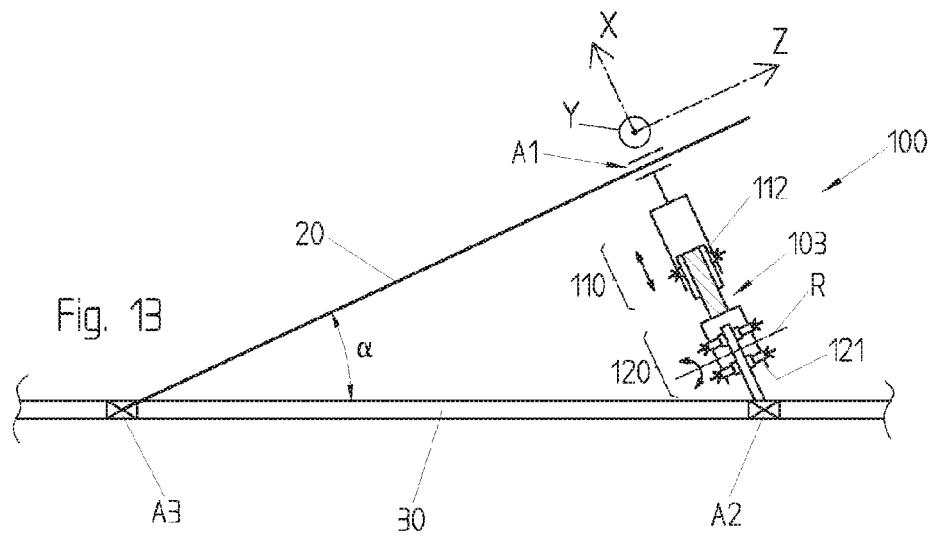
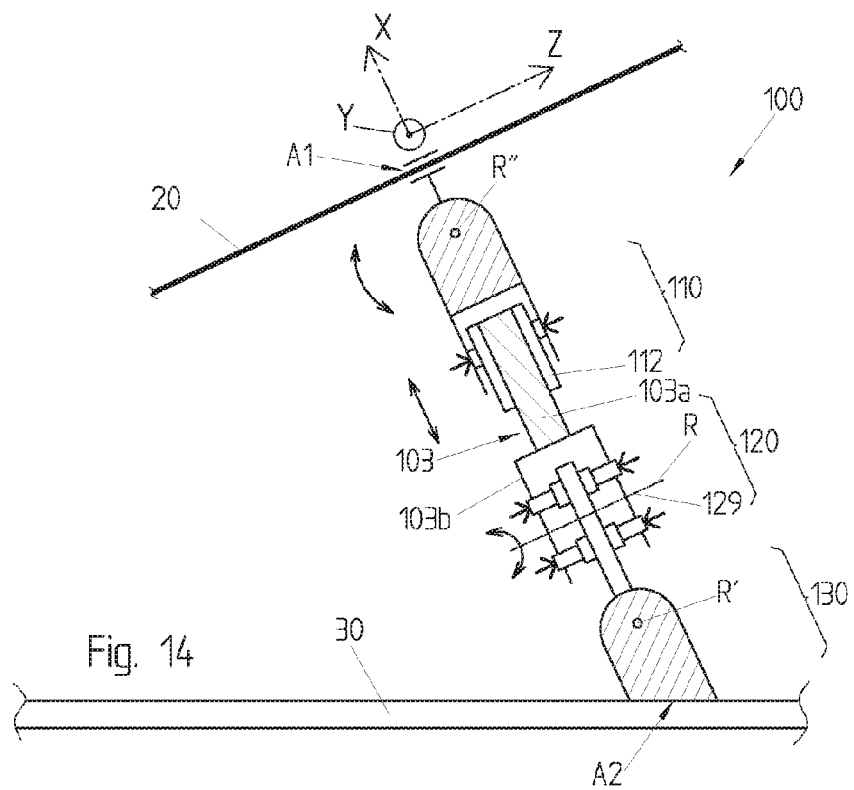

DEVICE AND METHOD FOR FRICTION DAMPING

RELATED APPLICATIONS

This application is a national phase of PCT/EP2014/078564, filed on Dec. 18, 2014 which claims priority to Switzerland Patent Application No. CH2096/13 filed on Dec. 18, 2013. The contents of the applications are hereby incorporated by reference.

TECHNICAL FIELD

The present invention concerns the field of civil engineering. In particular, the present invention concerns a device and a method for friction damping enabling the damping of relative displacements, and in particular oscillations, between a first structural element and a second structural element of a work of construction.

More particularly, but in no way limited thereto, the present invention concerns a device and a method for damping vibrations of cables in a work of construction, such as the stays of a bridge, of a roof, of a suspended walkway, of structural elements potentially subjected to vibrations or large-amplitude displacements or any other suspended work of construction.

STATE OF THE ART

In civil engineering works, different structural elements are frequently subjected to relative displacements, for example relative movements or relative vibrations.

It is known to dampen such relative displacements by using viscoelastic means or means acting by friction.

Thus, for example document FR 2 664 920 proposes a damping device for vibrations of a bridge stay. This device acts in a viscoelastic manner and implements a rigid pole mounted at an intermediary point of its length in a fixed sub base so as to be able to oscillate around this point in all directions. The displacements of the pole foot are dampened for example by means of viscoelastic elements. The amplitude of the movements that can be dampened is limited by the sub base at the level of the pole foot. This device does not allow large-amplitude displacements in all directions to be absorbed.

Furthermore, the implementation of systems such as described in document FR 2 664 920 involves using mechanical bearings whose performance in terms of fatigue and durability are limited and which therefore are not suitable for use in structures subjected to numerous cycles of dynamic loading.

Document EP1035350 describes another type of damping device, forming an internal damper operating by friction, wherein the transverse oscillation movements of a cable are dampened. However, this solution does not make it possible to dampen, within the same damping device, several components of a large-amplitude relative movement between a first structural element and a second structural element of a work of construction.

FR2751673 describes another device comprising an elastic or viscoelastic ring for damping the vibrations of a cable. This device is only adapted for damping small-amplitude vibrations in a plane perpendicular to the cable.

FR2631407 concerns improvements to devices for damping vibrations on stays and implements an annular member mounted on a segment of the stays. A pillow of paste or grease under pressure fills the ring cavity. A rigid structure connects the annular member to a foundation. Again, this device is not suitable for damping large-amplitude displacements along any directions.

It happens that the various structural elements of a work of construction move one relative to the other according to different components, for example by translation along two or three directions or by rotation around two axes, or according to a combination of linearly independent displacements. For example, the stays of a bridge sometimes move along a first direction orthogonal to the stay and directed towards the structural element supported by the stay, for example the bridge span, and along another direction perpendicular to the first direction and to the stay. Displacements of smaller magnitude in the direction of the stay can for example result from dilatations. Some structural elements also experience rotations relative to other structural elements of the same work of construction.

Existing damping devices are however poorly adapted for damping such complex displacements along various components.

BRIEF SUMMARY OF THE INVENTION

One aim of the present invention is to propose a damping device free from the limitations of the known devices and enabling displacements along different components between a first structural element and a second structural element of a work of construction to be dampened.

Another aim of the invention is to enable small and/or large amplitude displacements for each of the components of a complex displacement to be dealt with, with a damping that can be chosen independently for each of these elementary components.

According to the invention, these aims are achieved notably by means of a friction damping device for damping relative movements between a first structural element and a second structural element of a civil engineering construction work, comprising:

a first damping system for damping a first relative displacement component between said first structural element (20) and said second structural element, wherein said first damping system comprises a first friction surface and a second friction surface, wherein the first and second friction surfaces can furthermore be moved in translation relative to one another so as to allow said first relative displacement component to be dampened, wherein the first and second friction surfaces are in contact and constrained one against the other to form a first frictional engagement so that said first relative displacement component is dampened by said first friction engagement;

a second damping system for damping a second relative displacement component between said first structural element and said second structural element, wherein said second damping system comprises a third friction surface and a fourth friction surface, wherein the third and fourth friction surfaces are in contact and constrained one against the other, wherein the third and fourth friction surfaces can furthermore be moved in rotation relative to one another so as to allow said second relative displacement component to be dampened, wherein the first damping system and the second damping system are placed in series.

In this application, two damping systems are considered as placed in series if the first extremity of one system is connected by a fixed or articulated connection to a fixed point relative to the first extremity of the other system, and if the second extremity of the first system is connected by a fixed or articulated connection to a point whose displacements relative to the second extremity of the second system one wishes to dampen.

The invention concerns in particular a device wherein a first extremity of the first system and a first extremity of the second system are connected to one another by a fixed or pivoting connection, wherein a second extremity of the first damping system is connected by a fixed or pivoting connection with a stay and wherein the second extremity of the second system is connected by a fixed or pivoting connection to a structural element, for example a foundation or a bridge deck.

The first structural element can be a tensioned cable fastened by an anchoring point to the second structural element.

This solution has notably the advantage over the prior art of enabling each component of the relative displacement, and thus each type of corresponding oscillation, to be dealt with independently.

The different movement components to be dampened can be displacement components along different axes, for example translations and/or rotations along different axes.

The first relative displacement component can be constituted by a first translation along a first direction (X) extending between said first structural element and said second structural element.

The second relative displacement component can be constituted by a second translation along a third direction (Y) different from the first direction.

The third direction can be essentially orthogonal to the first direction (X) and to a second direction (Z) tangential to the first structural element (20).

Additionally, the different movement components to be dampened can be movement components according to different frequencies. For example, a first damping system can be optimized for damping low-frequency displacements whilst another damping system can be optimized for damping higher frequency displacements, for example vibrations.

Advantageously, damping the displacements according to the first component (resp. second component) thanks to the first (resp. second) damping device has no influence on damping the displacements according to the second (resp. first) component by the second (resp. first) damping device in series.

Each damping system preferably allows a large-amplitude relative displacement along or around a single axis, constituting the main axis of this system. For example, the first damping system allows a large-amplitude translation along the axis X whilst the second damping system allows a large-amplitude rotation around the axis Z. A translation is considered to be of large amplitude when it exceeds for example 500 mm. A rotation is considered to be of large amplitude when it exceeds for example 10°, preferably 15°. Translations and/or rotations along these main axes are dampened thanks to the friction surfaces.

Furthermore, each damping system advantageously comprises guiding elements that enable parts in relative movement to move relative to one another and that preferably furthermore allow small-magnitude displacements along or around at least one axis different from the main axis. For example, the guiding elements of the first damping system can allow small-amplitude translations along the axis Y or small-amplitude rotations around the axis Z. A displacement of less than 10 millimeters or a rotation of less than 1° are for example considered small-amplitude displacements. These additional degrees of freedom limit the constraints on the components of the system.

According to a preferred arrangement, the first displacement component is a translation movement along a first direction (X) extending between the first structural element and the second structural element.

According to another preferred arrangement, adopted alone or in combination with the preceding arrangement, the second relative displacement component is a translation movement along a second direction (Y). In the presence of these two preferred arrangements, the second direction (Y) is preferably orthogonal to the first direction (X). Advantageously, this second direction (Y) is essentially orthogonal to the longitudinal direction of the first structural element that is constituted preferably by an element having a generally elongated shape, in particular a cable.

One of the advantages of the inventive solution is to allow complex relative movements to be dampened, i.e. movements comprising several components, using a single device mounted between a first structural element and a second structural element. It is thus possible to avoid having to use several distinct devices that require a longer assembly and more space which can prove problematic in some configurations of works of construction.

The choice of material used on the one hand for the first friction surface and on the other hand for the second friction surface, on the one hand within the first damping system and on the other hand within the second damping system, as well as the regulation of the pressure force between the two friction elements, make it possible to determine the amplitude of the damping of the relative movement component in question. In this manner, it is thus possible to determine the operating characteristics of the first (second) damping system, such as the value range for intensity, frequency and/or energy of the relative displacement handled by this first (second) damping system.

For example, using a polymer or polymer-matrix material for the first friction element and a metallic material with a given surface hardness for the second friction element allows the damping system to act on a large range of vibration amplitudes.

It is also possible to use polymers for both friction elements or steel for the two friction elements.

The present invention also relates to a civil engineering construction work comprising a first structural element and a second structural element, comprising at least one damping device such as described in the present text.

In such a civil engineering construction work, the first structural element can be for example a tensioned cable fastened at an anchoring point to the second structural element.

Thus, for example, in such a civil engineering construction work, the second structural element can be a foundation, in particular a bridge deck or a structure element integral with a bridge deck, or a suspended roofing element or structure element integral with a suspended roof.

The present invention also relates to a method for friction damping relative movements between a first structural element and a second structural element of a civil engineering construction work, comprising the following steps:
  providing a first damping system for damping a first relative displacement component between said first structural element and said second structural element and comprising:
  a first friction surface, fixed and mechanically connected with the first structural element, a second friction surface capable of moving relative to the first friction surface (111), providing a second damping system for damping a second relative displacement component between said first structural element and said second structural element, wherein said first relative displacement component is different from the second relative displacement component, said second damping system comprising:

a third friction surface, a fourth friction surface, placing the first friction surface and the second friction surface on the one hand and the third friction surface and the fourth friction surface on the other hand in contact by constraining one against the other to form two frictional engagements so that the relative movement between on the one hand the first friction surface and the second friction surface and on the other hand between the third friction surface and the fourth friction surface is dampened by said friction engagement.

BRIEF DESCRIPTION OF THE FIGURES

Examples of embodiments of the invention are indicated in the description illustrated by the attached figures in which:

FIG. 3 is a front view of the damping device along direction III-III of FIG. 1, FIG. 4 is a cross-section view along the direction IV of FIG. 3, FIG. 5 is a side view of the damping device along direction V of FIG. 1, FIG. 6 is a cross-section view of FIG. 5 along the direction VI-VI, FIGS. 7 to 9 are cross-section views of FIG. 6 respectively long the directions VII-VII, VIII-VIII and IX-IX, FIG. 10 is a side view of the damping device according to the direction V of FIG. 1, FIGS. 11 and 12 are cross-section views of FIG. 10, respectively along the directions XI-XI and XII-XII, FIG. 13 represents the first embodiment of the invention according to a simplified representation showing the kinematics of the damping device within a work of construction, FIG. 14 illustrates a second embodiment of the invention, also in a simplified manner, by showing the kinematics of the damping device within a work of construction.

DETAILED DESCRIPTION OF EXAMPLES OF EMBODIMENTS

Figure 1:
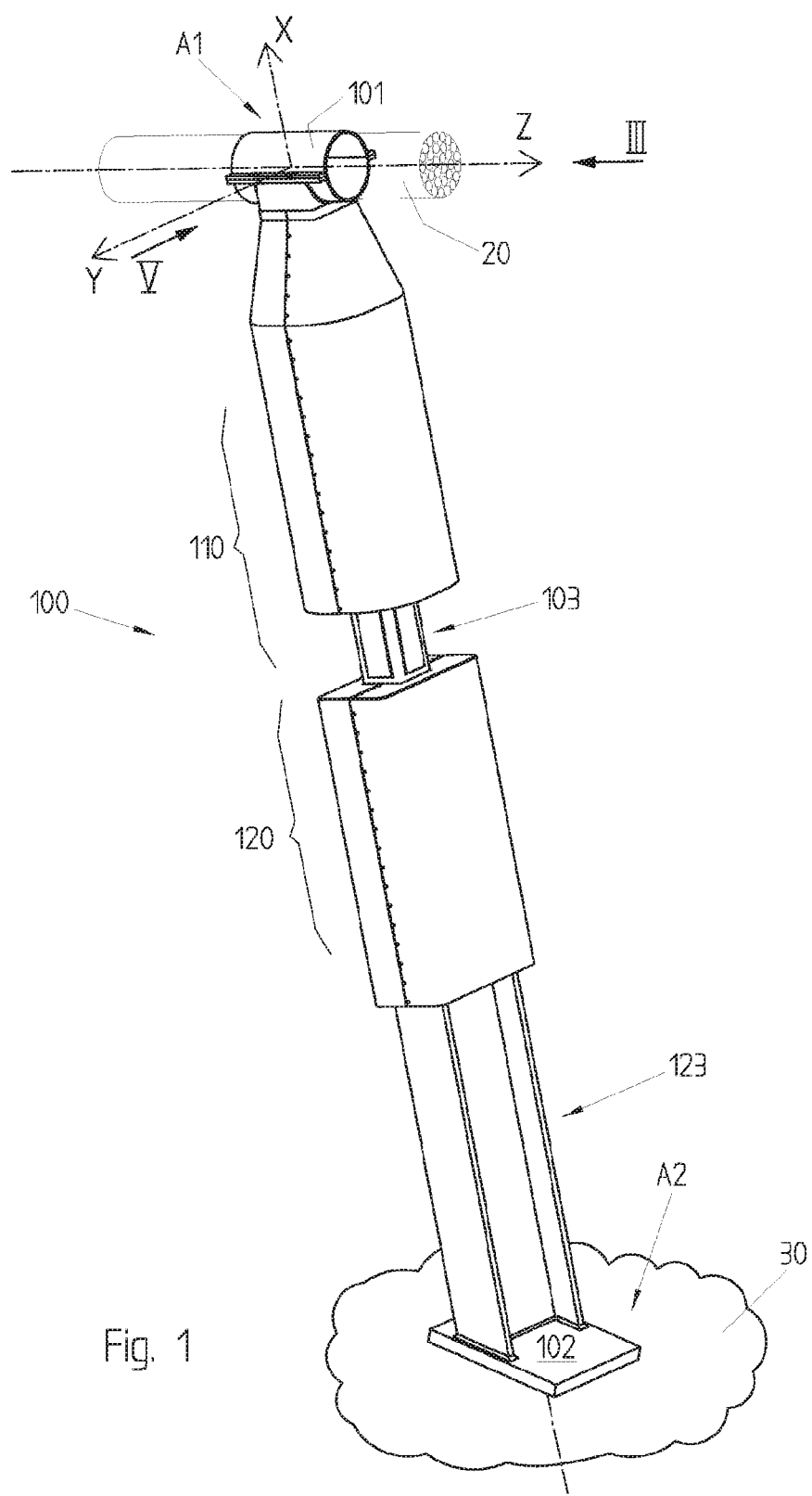
FIG. 1 illustrates a first embodiment of the invention representing a damping device in perspective.

As can be seen in FIGS. 1 and 13, the damping device 100 according to the first embodiment is mounted in this example between a cable 20 or stay (forming a first structural element) and a second structural element 30, for example a foundation, a slab, the deck of a suspended bridge or else a part mounted integrally with such a deck. The cable can be connected to a pylon or strut (not represented).

With respect to the cable 20, the damping device 100 is mounted for example by a sleeve 101 enclosing the cable 20 and forming a first anchoring point A1. The sleeve 101 can be fixed relative to the cable or capable of sliding longitudinally along this cable.

With respect to the foundation 30, the damping device 100 is mounted for example by a mounting flange 102 welded or riveted to the foundation 30 and forming a second anchoring point A2.

The damping device 100 thus connects the first anchoring point A1 to the second anchoring point A2 along a first direction X corresponding to the longitudinal direction or main direction of the damping device 100. In this arrangement, a second direction (Z) is defined by the cable 20 and is orthogonal to the first direction (X). A third direction (Y) orthogonal to the first direction (X) and to the second direction (Z) is also defined. In practice, the plane (X, Y) containing the first direction (X) and the third direction (Y) corresponds to the plane normal to the tangent of the cable 20 at the point A1. Typically, the cable is subjected to movements of greater amplitude in this plane than along the second direction (Z).

In this first embodiment illustrated in FIGS. 1 to 13, the damping device 100 is comprised of a first damping system 110 situated in the part of the damping device 100 adjacent to the cable 20 (upper part of the damping device 100 in FIGS. 1 and 13) and of a second damping system 120 situated in the part of the damping device 100 adjacent to the foundation 30 (lower part of the damping device 100 in FIGS. 1 and 13). As will be described in detail hereinafter, the first damping system 110 makes it possible to absorb and dampen the translation component between the cable 20 and the foundation 30 along the first direction X, for example slow displacements or oscillations along the axis X.

As for the second damping system 120, it makes it possible to absorb and dampen the displacements of the cable along the axis Y, by projecting them in the form of rotation around the axis Z of an intermediate member 103 relative to the remaining assembly 120. This second damping system also allows relatively slow displacements or higher-frequency vibrations to be dampened.

In this example, the intermediate member 103 (see FIG. 2) is common to the first damping system 110 and to the second damping system 120 which it connects. This rigid intermediate member 103 forms the material junction between said first damping system 110 and said second damping system 120. Thus, the damping system 100 according to the first embodiment comprises two damping systems 110 and 120 placed in series and each allowing a different relative displacement component to be dampened.

Figure 2:
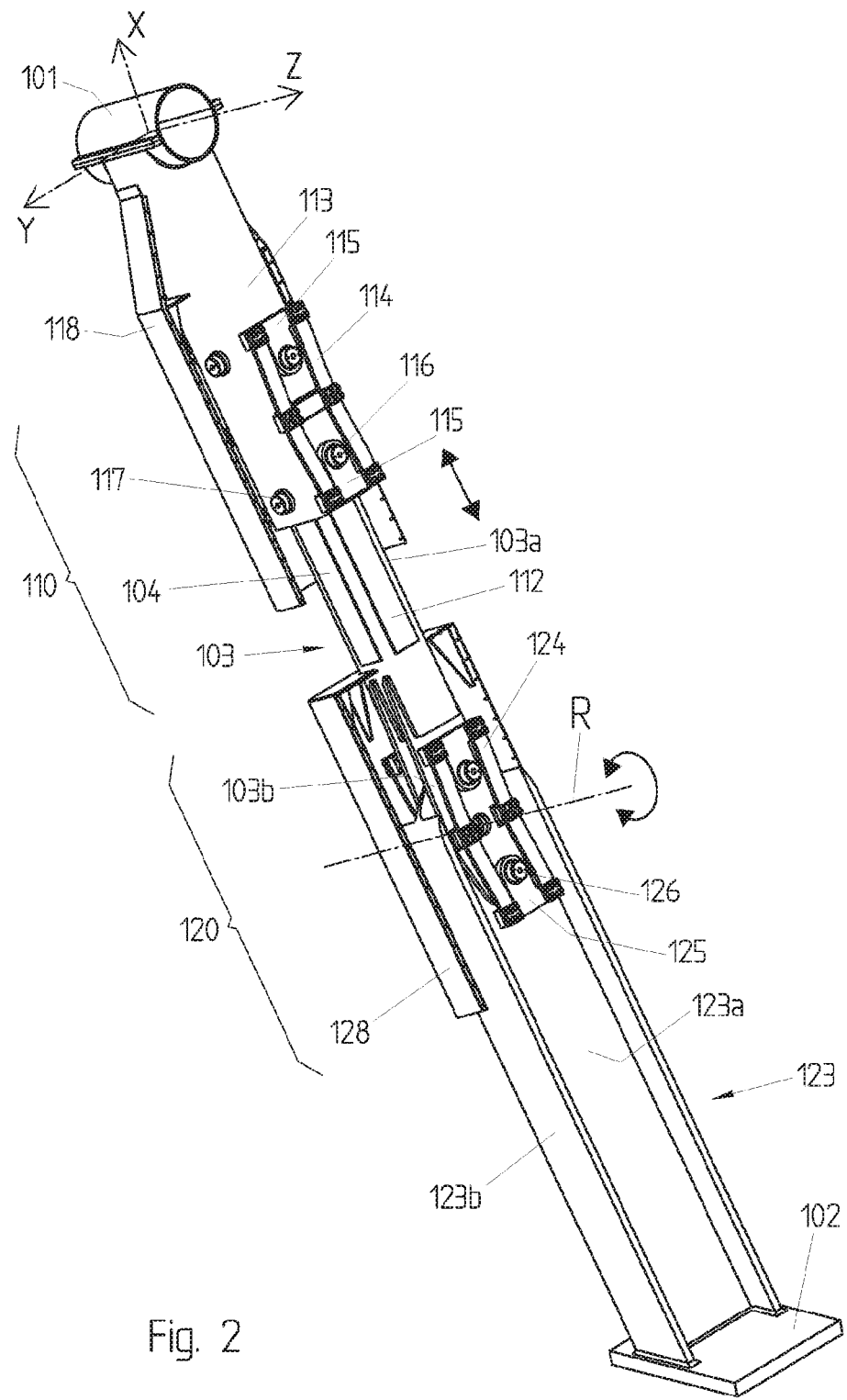
FIG. 2 is a view similar to FIG. 1 with some outer portions being removed to show the inside of the damping device.

The intermediate member 103 comprises a first extremity 103a (at the top in FIGS. 1 and 13) provided with a second friction element 112 that is part of the first damping system 110 (see FIGS. 2 and 4). The second extremity 103b of this member (at the bottom in FIGS. 1 and 13) is provided with a third friction element 121 that is part of the second damping system 120 (see FIGS. 4 and 9).

The first damping system 110 of the damping device according to the first embodiment will now be described. This damping system allows a translation along the axis X of the intermediate member 103 relative to the other components of the first damping system. The force necessary for this translation is determined by the friction of the friction zones in contact on the member 103 and on an element of the first damping system 110, so as to achieve a damping.

More specifically, the first extremity 103a of the intermediate member 103 forms a slide extending along the first direction (X) and defining two plane faces, parallel to one another and to the first direction (X). These faces are equipped with said second friction element 112 of the first damping system 110. In a non-limiting example, this second friction element is executed in the form of a second series of friction pads extending along the first direction (X). In order to cooperate by friction with this second series of friction pads, the first damping system 110 further comprises a hollow tube 113 equipped with a friction element 111, here in the form of a first series of friction pads protruding on the inner side of the tube 113 and being pushed by elastic return means, for example spring blades, in the direction of the inside of the tube 113. The tube 113 is engaged around the slide so that one surface of the first series of friction pads 111 and of the second series of friction pads 112 rub against one another. The friction surfaces can be defined by other elements than series of pads that can be used.

Thus, through this contact under controlled pressure, the friction between the surface of the first series of friction pads 111 (here disc-shaped pads) and the surface of the second series of friction pads 112 (here pads in the shape of an elongated track, for example rectangular) during a relative translation displacement along the first direction X (towards the top and/or the bottom in FIGS. 1, 2 and 13) between the hollow tube 113 (which follows the elementary movement of the cable 20 along the first direction X) and the slide 103 makes it possible to dampen a relative movement component along the axis X.

The elastic return means can be formed of a system with spring blades 114 constrained in the direction of the inside of the tube 113 and which press on two rigid tongues 115 each carrying a support 116 for a friction pad 111. The support 116 traverses the wall of the tube 113 at a bore hole 113a. Here, the two rigid tongues 115, and thus the two friction pads, work in pairs with each of the two aforementioned plane faces of the slide bearing the second series of friction pads 112. However, as an alternative, it is possible to use on each side of the slide forming the first extremity 103a of the intermediate member 103, a single friction pad carried by a single support such as the rigid tongue 115. It will be understood that this return system by spring blades 114 also allows a slight displacement of the cable 20 along the second direction Z to be absorbed. This displacement is generally considerably smaller than the displacement components along the first direction X or along the third direction Y; it is typically a displacement of 10 to 20 mm due to the dilatation or contraction of the cable material due to variations in temperature.

Different types of systems can be provided for regulating the constraint of the pressure exerted by the spring blades 114 on the rigid tongues 115 and consequently on the friction pads 111. On the most part of its length comprising its extremity receiving the slide 103a, the hollow tube 113 has a square section. At its extremity opposite that receiving the slide 103a, the hollow tube 113 is fastened in an integral manner, for example by welding, with the sleeve 101.

In the case illustrated, the slide 103a is a hollow cylinder having a square section and also carries friction pads forming guiding pads 104 on the other two sides opposite two by two and alternating with the sides bearing the second series of friction pads 112. These guiding pads 104 act as support for guiding elements 117 placed through the walls of the tube 113 opposite two by two and alternating with the sides bearing the first series of friction pads 111, with these guiding elements 117 serving as abutment for limiting any lateral movement (along the third direction Y) between the tube 113 and the slide 103.

In this example, the intermediate member 103 is a male element that penetrates in the hollow tube 113 of the first damping system. It is possible to invert this configuration and to make a female intermediate member sliding around a male element connected to the first structural element 20.

The guiding elements 117 allow the intermediate member 103 a relative displacement in relation to the assembly 103 and to the cable 20 that is constituted purely of a translation along the axis X; a translation of limited amplitude along the axis Y, or even a rotation of limited angle around the axis Z, are possible.

Thanks to these guiding elements at each articulation, the displacement components for the movement of the first structural element 20 relative to the second structural element 30 that do not need to be dampened are left free or are restrained by low stiffness (mildly rigid) mechanical connections. Typically, the force, resp. the torque, required for a displacement along an axis other than that which needs to be dampened is on the order of 1 to 15% of the force, resp. of the torque, that is necessary for a displacement of 3 to 500 mm, or of 1° to 15°, along the dampened direction.

With such an arrangement, the damping device 100 according to the invention can accept large-amplitude translation movements along the axis X whereas the known external friction damping devices are usable up to movement values along the axis X on the order of 50 mm (millimeters) above and below the mean position. Thus, the damping device 100 according to the invention makes it possible to dampen a vertical movement of the cable 20 beyond 50 mm, for example up to 500 mm, even up to 700 mm or up to 1000 mm, even beyond that.

The second damping system 120 of the damping device 100 according to the first embodiment will now be described. This damping system enables a rotation around the axis Z of the intermediate member 103 relative to the other components of the second damping system. The torque required for this rotation is determined by the friction of friction zones in contact on the member 103 and on an element of the second damping system 120, so as to achieve a damping.

More specifically, the second extremity 103b of the intermediate member forms a stirrup (an element in the shape of an upturned U) with two plane working walls, parallel to one another and to the first direction (X), equipped with the third friction element 121 in the form of a third series of friction pads (here disc-shaped pads 121, see FIG. 4) protruding on the inner side of said working walls and being pushed by elastic return means (here spring blades 124) in the direction of the space separating the two work walls. The work walls are also each provided with a through bore surrounded by the third series of friction pads 121.

To cooperate by friction with this third series of friction pads 121, the damping system 100 further comprises an I-shaped beam 123 comprising two wings 123b and a central web 123a equipped with the fourth friction element 122 in the form of a fourth series of friction pads 122 (here disc-shaped pads 122 of larger diameter than the pads 121, see FIG. 4) placed on the sides of said central web 123a and surrounding an opening aligned with and between said through bores (see FIG. 9). Said beam 123 is capable of engaging with said stirrup 103b, between the two work walls, so that the extremity segment of the web 123a is placed between said work walls with the edges of the extremity segment of said work walls being lodged between the wings 123b of the beam 123. The damping device 100 further comprises (see FIGS. 4, 6, 7, 11 and 12) a material shaft 129 passing in said opening and said through bores while being coaxial with said rotation axis (R). Alternatively (see FIG. 2), the aforementioned material shaft 129 is omitted and other lateral guides are used between the stirrup 103b and the beam 123, such as punctual lateral supports parallel to the third direction Y. Thus, during a rotation movement around said rotation axis (R) between said beam 123 and said stirrup 103b, the surface of the third series of friction pads 121 and the surface of the fourth series of friction pads 122 rub against one another and dampen the relative displacements along the axis Y, by converting them into a rotation movement around said rotation axis (R). It will be understood that the rotation axis (R) goes through the opening of the web 123a and through the through bores of the work walls of the stirrup 103b, and is parallel to the third direction (Z).

In this embodiment, in order for operation to be possible, and in particular for the stirrup 103b to be able to mount by overlap on either side of the upper extremity of the central web 123a, the span of the I-beam, i.e. the distance between the wings 123b, is greater than the width of the work walls of the stirrup 103b. Furthermore, the maximum rotation angle around the axis R (material shaft 29) between the stirrup 103b and the beam 123 is limited by the edges of the extremity segment of said work walls of the stirrup 103b coming to abut against the wings 123b of the beam that constitute guiding means.

With such an arrangement, the damping device 100 can accept rotation movements of the intermediate member along the axis R with an angle value sufficient for compensating large amplitudes of displacement of the cable along the second direction Y. In one example, the maximum rotation angle is on the order of +−15° relative to the mean position, i.e. an angular displacement of 30°. Depending on the length of the components, this movement makes it possible to compensate for a translation component of the cable along the second direction on the order of −500 mm to +500 mm. Angles of 10° (angular displacement of 20°), of 25° (angular displacement of 50°), or even up to 30° (angular displacement of 60°) can also be considered, as can different maximum amplitudes depending on the direction relative to the resting position.

It will be understood that the displacement movement of the cable 20 can be decomposed in three elementary translation movements respectively along the first direction X, the second direction Z and the third direction Y. The cable's rotation movements are generally much smaller and can generally be neglected. The three translation components, and the possible rotation components, are dampened thanks to the three components of the movement allowed respectively by the first damping system (translation component along the first direction X), the second damping system (rotation component around the axis R to compensate for the elementary movement along the third direction Y) and the displacement of the spring blades (component identical to the elementary translation movement along the second direction Z). Thus, the X translation component of the cable is dampened essentially by the first damping system whilst the Y translation component (perpendicular to X and to the cable) is essentially dampened by the second damping system. The Z translation component of the cable is generally considerably smaller than the X and Y components.

In the illustrated example, the elastic return means of the second damping system 120 are analogous to those previously described for the first damping system 110: rigid tongues 125 carrying supports 126 for the pads 121 of the third series of friction pads, and spring blades 124 constrained in the direction of the inside of the stirrup 103b and driving the rigid tongues 125.

The second and third friction surfaces are advantageously eccentric relative to the rotation axis. Generally, the friction surfaces for damping the rotation in damping systems are advantageously eccentric.

Removable external covers 118 and 128 enable respectively the first damping system 110 and the second damping system 120 to be enveloped and protected.

The damping device described here above thus comprises a first element 113 integrally united with the first structural element 20, a second element 123 integrally united with the second structural element 30 and an intermediate member 103 capable of translating along a linear axis relative to the first element 113 and capable of pivoting around an axis relative to the second element 123. Means for guiding the intermediate member 103 relative to the first element 113 allow a limited freedom of translation along the axis Y and/or Z and/or of rotation of the intermediate member 103 relative to the first element 113. In the same manner, means for guiding the intermediate member 103 relative to the second element 123 allow a limited translation and/or rotation freedom of the intermediate member 103 relative to the second element 123.

The intermediate member can also be replaced by different components assembled or articulated to one another.

Additional degrees of freedom can be provided. For example, the first element 113 can be free in rotation and/or translation relative to the cable 20. In the same way, the second element can be free in rotation and/or translation relative to the second structural element 30. Additional damping systems can be mounted in series with the first or second damping systems 110, 120 in order to dampen other displacement components. Damping systems in parallel with any of the first or second damping systems 110, 120 can also be considered in the case of large forces or torques.

Attention is now turned towards a second embodiment illustrated schematically in FIG. 14. This second embodiment comprises three friction damping systems 110, 120 and 130 placed in series and each enabling one different relative displacement component to be dampened. To this effect, in addition to the first damping system 110 and to the second damping system 120 described previously in relation to FIGS. 1 to 13, the damping device 100 comprises a third damping system 130 for damping a third relative displacement component between the second structural element (cable 20) and the second structural element (foundation 30) and comprising:

a first friction surface fixed relative to the second structural element, a second friction surface fixed relative to the second damping system 120, wherein the first friction surface and the second friction surface of the third damping system are in contact and constrained against one another to form a friction engagement so that the relative movement between the first friction surface and the second friction surface of the third damping system is dampened by said friction engagement, wherein the first damping system, the second damping system and the third damping system are placed in series, and wherein the third relative displacement component is different from the first relative displacement component and from the second relative displacement component.

Instead of being directly connected to the foundation 30 as in the case of the first embodiment, the lower extremity of the second damping system 110 is connected here to the third damping system 130.

Preferably, the third relative displacement component is dampened thanks to a rotation movement around an axis R' parallel to a third direction different from the second direction R around which the rotation allowed and dampened by the second damping system occurs. In FIG. 14, the rotation axis R' is parallel to the third direction Y and enables an elementary translation movement of the cable along the second direction Z to be dampened. This rotation is preferably dampened for example by means of friction pads, not represented. In non-limiting manner, given by way of example, as illustrated in FIG. 14, the third damping system 130 is mounted between the second damping system 120 and the foundation 30. This rotation could however occur around another rotation axis than the rotation axis R'. Furthermore, the embodiment of FIG. 14 also provides for a non-dampened rotation around the axis R" parallel to R' and placed between the stay 20 and the first damping system 110.

With respect to the friction pads and more generally the friction elements that achieve the damping by friction between two friction surfaces in contact with a contact pressure one against the other, as has been seen previously, the choice of the friction material or materials present in the couple accomplishing the friction engagement is a determining parameter for the damping properties of the corresponding damping system. In one example, the first friction surface is made of a first friction material and the corresponding second friction surface of the same damping system is made of a second friction material, identical or different. At least one among said first friction material and said second friction material is a polymer or polymer-matrix material with a reduced friction coefficient. This type of friction material has a number of advantages, and notably the fact that the friction coefficient is essentially constant over time and in variable humidity and temperature conditions. Optionally, such a polymer material contains a lubricant. Furthermore, such a polymer material is preferably on the basis of polyethylene terephthalate.

The present invention also concerns a civil engineering construction work with a cable 20 that is mounted on the foundation 30 at the location of an anchoring point (third anchoring point A3), with the damping device 100 being mounted between said cable 20 and said foundation 30 in a manner removed from said aforementioned anchoring point. This type of arrangement corresponds to a damping device called "external damping device" in contrast to other types of damping devices, called "internal damping devices" that are an integral part of the cable and practically invisible (as in document EP1035350) but are more generally concentric around the cable 20.

Figure 15:
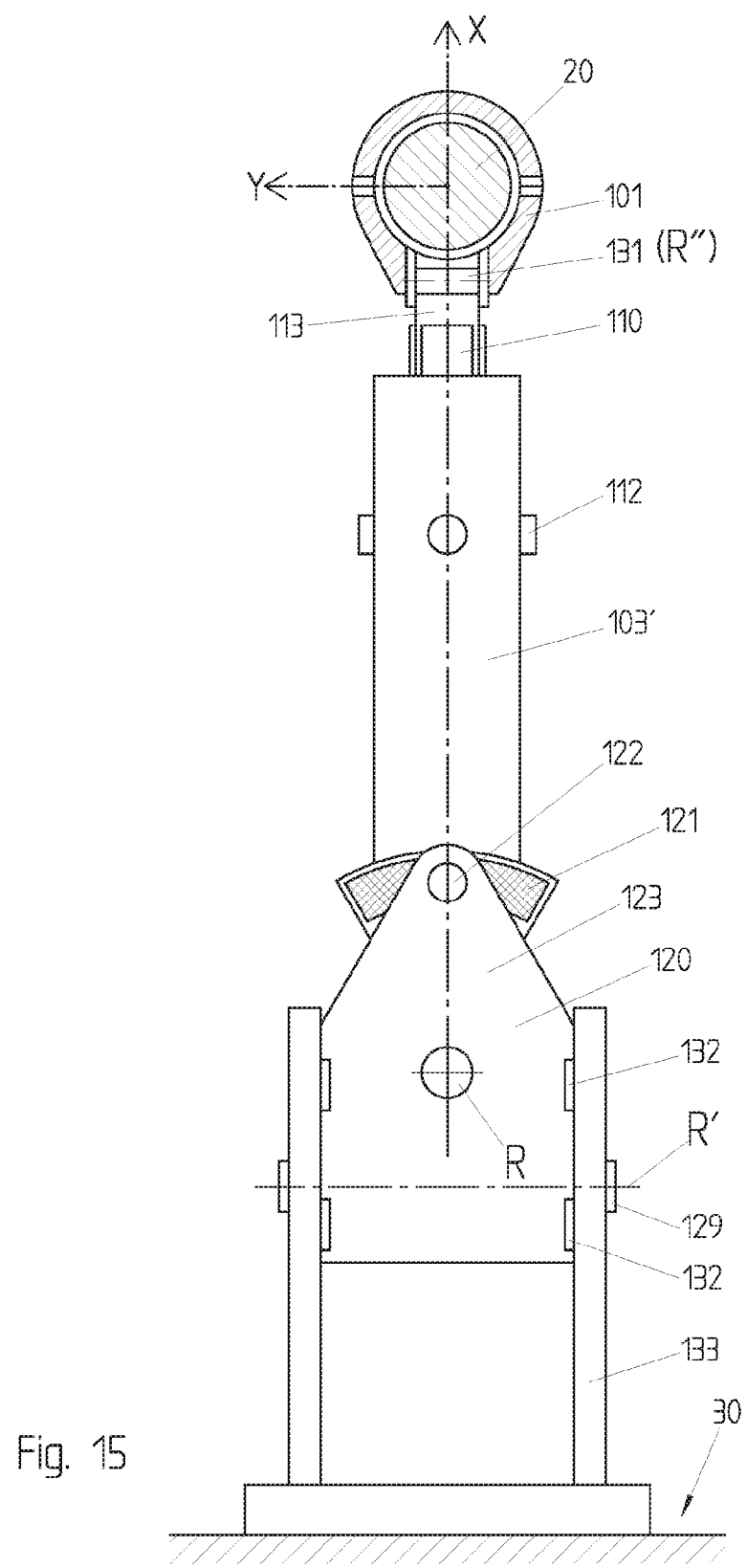
FIG. 15 illustrates in a simplified manner a third embodiment of the invention.

FIG. 15 illustrates a third embodiment wherein a first element 113 of the first damping system 110 is connected in an articulated manner to the sleeve 101 thanks to a shaft 131 (R") parallel to the axis Y and enabling the element 113 to pivot around the axis Y relative to the cable 20. Furthermore, an element 123 of the second damping system 120 is connected in an articulated manner to the second structural element 30, thanks to a pivot 129 allowing a rotation around the axis R' parallel to the axis Y and enabling the element 123 to pivot around the axis Y relative to the second structural element 30. Optionally, the sleeve 101 could still move longitudinally along the axis Z parallel to the cable 20. The shaft 131 is optional and preferably non dampened. The shaft 129 is preferably dampened by means of fifth and sixth friction surfaces 132, for example pads, between the element 123 and the stirrup 132 integral with the foundation 30.

The first element 113 can furthermore slide relative to the intermediate member 103', through friction surfaces 111, 112 on these two components, in the manner described further above. In this example, the intermediate member 103' is however constituted by a hollow tube in which the element 113 is engaged in a sliding manner. This translation is dampened thanks to the friction surfaces on the element 113 and on the tube 103'.

The intermediate member 103' can furthermore pivot around the axis R parallel to the axis Z. This rotation is dampened thanks to the semi-circular friction surface 121 connected to the member 103' and to a friction surface opposite on the element 123.

Optionally, the friction surfaces can also be provided for damping rotations around the shafts 131 and/or 129.

In FIG. 13, the damping device 100 forms with the cable 20 and with the foundation 30 a right-angle triangle with an acute angle alpha whose apex is placed at said anchoring point A3 between the cable 20 and the foundation 30. In this case, the right angle is formed between the cable 20 (second direction Z) and the damping device 100 (first direction X).

REFERENCE NUMBERS USED IN THE FIGURES

20 Cable (first structural element)
30 Second structural element
X First direction
Z Second direction
Y Third direction
A1 First anchoring point
A2 Second anchoring point
A3 Third anchoring point
100 Damping device (first embodiment)
100' Damping device (second embodiment)
101 Sleeve
102 Mounting flange
103 Intermediate member
103a First extremity of the intermediate member (slide)
103b Second extremity of the intermediate member (stirrup)
104 Guiding pads
110 First damping system
111 First friction surface (first series of friction pads)
112 Second friction surface (second series of friction pads)
113 Hollow tube
113a Bore hole
114 Spring blades
115 Rigid tongues
116 Support
117 Guiding elements
118 External cover
120 Second damping system
121 Third friction element (third series of friction pads)
122 Fourth friction element (fourth series of friction pads)
123 I-beam
123a Central blade
123b Wings (guiding elements)
124 Spring blades
125 Rigid tongues
126 Support
128 External cover
129 Rotation axis in Z (material shaft)
130 Third damping system
131 Rotation axis in Y (material shaft)
132 Fifth and sixth friction surfaces
133 Stirrup

The invention claimed is:
1. A friction damping device for damping the relative movements between a first structural element and a second structural element of a civil engineering construction work, comprising:

a first damping system for damping a first relative displacement component between said first structural element and said second structural element, wherein said first damping system comprises a first friction surface and a second friction surface, wherein the first and second friction surfaces are in contact and constrained one against the other to form a first frictional engagement, wherein the first and second friction surfaces can furthermore be moved in translation relative to one another so as to allow said first relative displacement component to be dampened;

a second damping system for damping a second relative displacement component between said first structural element and said second structural element, wherein said second damping system comprises a third friction surface and a fourth friction surface, wherein the third and fourth friction surfaces are in contact and constrained one against the other to form a second friction engagement, wherein the third and fourth friction surfaces can furthermore be moved in rotation relative to one another so as to allow said second relative displacement component to be dampened, wherein the first damping system and the second damping system are placed in series.

2. A friction damping device according to claim 1, wherein the first relative displacement component is constituted by a first translation along a first direction extending between said first structural element and said second structural element, and in that the second relative displacement component is constituted by a second translation along a third direction different from the first direction.

3. A friction damping device according to claim 2, wherein said third direction is essentially orthogonal to said first direction and to a second direction tangential to the first structural element.

4. A friction damping device according to claim 1, wherein said second relative displacement component is projected into said device according to said rotation, said rotation being performed around an axis parallel to the second direction.

5. A friction damping device according to claim 1, wherein the first and the second relative displacement component are both constituted by translations.

6. A friction damping device according to claim 1, wherein said first structural element is a tensioned cable fastened at an anchoring point to said second structural element.

7. A friction damping device according to claim 1, wherein it further comprises an intermediate member between said first damping system and said second damping system, wherein said intermediate member comprises a first extremity provided with said second friction surface and a second extremity provided with said third friction surface.

8. A friction damping device according to claim 7, wherein said first extremity of the intermediate member forms a slide extending along the first direction and defining two plane faces, parallel to one another and to the first direction, equipped with said second friction surface in the form of second friction pads extending along the first direction, in that the damping device further comprises a tube equipped with said first friction surface in the form of first friction pads protruding on the inner side of the tube and being pushed by elastic return means in the direction of the inside of the tube, wherein said tube is engaged around said slide so that the first series of friction pads and the second series of friction pads rub against one another.

9. A friction damping device according to claim 7, wherein said second extremity of the intermediate member forms a stirrup with two plane working walls, parallel to one another and to the first direction, equipped with said third friction surface in the form of third friction pads protruding on the inner side of said working walls and being pushed by elastic return means in the direction of the space separating the two work walls, wherein said work walls are also each provided with a through bore surrounded by the third friction pads, in that the damping device further comprises an I-beam having two wings and a central web equipped with said fourth friction surface in the form of fourth friction pads placed on the sides of said central web and surrounding an opening aligned with and between said through bores, wherein said beam is engaged with said stirrup so that the extremity segment of the web is placed between said work walls with the edges of the extremity segment of said work walls being lodged between the wings of the beam, and in that during a rotation movement around said rotation axis between said beam and said stirrup, the third friction pads and the fourth friction pads rub against one another and dampen said rotation movement.

10. A friction damping device according to claim 1, wherein it further comprises a third damping system for damping a third relative displacement component between said first structural element and said second structural element and comprising:

a fifth friction surface fixed relative to the second structural element, a sixth friction surface fixed relative to the second damping system, wherein the fifth friction surface and the sixth friction surface are in contact and constrained against one another to form a third friction engagement so that the relative movement between the fifth friction surface and the sixth friction surface is dampened by said third friction engagement, wherein the first damping system, the second damping system and the third damping system are placed in series, and wherein the third relative displacement component is different from the first relative displacement component and from the second relative displacement component.

11. A friction damping device according to the claim 10, wherein the fifth and sixth friction surfaces are in rotation one relative to the other to dampen the third relative displacement component.

12. A friction damping device according to claim 1, wherein the first friction surface is made in a first friction material, in that the second friction surface is made in a second friction material and in that at least one from said first friction material and said second friction material is a polymer material with reduced friction coefficient.

13. A civil engineering construction work comprising a first structural element and a second structural element, wherein it comprises at least one damping device according to claim 1.

14. A civil engineering construction work according to claim 13, wherein said first structural element is a tensioned cable fastened by an anchoring point to said second structural element.

15. A civil engineering construction work according to claim 14, wherein said second structural element is a foundation, in particular a bridge deck.

16. A civil engineering construction work according to claim 15, wherein said cable is mounted on said foundation at the location of an anchoring point and in that the damping device is mounted between said cable and said foundation in a manner removed from said aforementioned anchoring point.

17. A civil engineering construction work according to claim 16, wherein said damping device forms with the cable and said foundation a right-angle triangle with an acute angle whose apex is placed at said anchoring point.

18. A method for friction damping relative movements between a first structural element and a second structural element of a civil engineering construction work, comprising the following steps:
 providing a first damping system for damping a first relative displacement component between said first structural element and said second structural element and comprising:
  a first friction surface, fixed relative to the first structural element,
  a second friction surface capable of moving relative to the first friction surface,
 providing a second damping system for damping a second relative displacement component between said first structural element and said second structural element, wherein said first relative displacement component is different from the second relative displacement component, said second damping system comprising:
  a third friction surface,
  a fourth friction surface,
 placing the first friction surface and the second friction surface on the one hand and the third friction surface and the fourth friction surface on the other hand in contact by constraining one against the other to form two frictional engagements so that the relative movement between on the one hand the first friction surface and the second friction surface and on the other hand between the third friction surface and the fourth friction surface is dampened by said friction engagement.

* * * * *